Dec. 25, 1962 K. A. STRZALA 3,069,965
APPARATUS FOR DETECTING IMPERFECTIONS IN GLASS CONTAINERS
Filed April 24, 1959 2 Sheets-Sheet 1

INVENTOR.
KAZIMER A. STRZALA
BY J. Ralph Hoge
& W. A. Schaich
ATTORNEYS

Dec. 25, 1962 K. A. STRZALA 3,069,965
APPARATUS FOR DETECTING IMPERFECTIONS IN GLASS CONTAINERS
Filed April 24, 1959 2 Sheets-Sheet 2

INVENTOR.
KAZIMER A. STRZALA
BY J. Ralph Hoge &
W.G. Schaick
ATTORNEYS

United States Patent Office 3,069,965
Patented Dec. 25, 1962

3,069,965
APPARATUS FOR DETECTING IMPERFECTIONS IN GLASS CONTAINERS
Kazimer A. Strzala, Walnut Creek, Calif., assignor to Owens-Illinois Glass Company, a corporation of Ohio
Filed Apr. 24, 1959, Ser. No. 808,756
4 Claims. (Cl. 88—14)

My invention relates to apparatus for detecting imperfections in glass containers, and more particularly crizzles and the like defects generally in the glass comprising the mouth or neck portions. This, in the glass industry is referred to as the "finish" of the container. Apparatus of the type with which my invention is well adapted for use and with which it is in fact used in the trade, is shown in U.S. Patent Number 2,849,114 issued August 26, 1958 to B. A. Noble et al. entitled, "Apparatus for Inspecting and Classifying Glass Containers." In such apparatus, the cradles bring the containers, bottles or jars formed of glass, to inspecting or gauging stations and at each station the cradles are momentarily held stationary while an inspecting or gauging operation is performed.

My invention comprises the provision of novel means for so positioning a focused light relative to the finish of a jar or bottle at the crizzle detecting station, either actually within the container mouth, or in the event the container is a narrow neck bottle, then quite close to the neck, that focused light reflected by a check or crizzle in the glass will operate through a "pick-up" or some comparable device to actuate mechanism for removing the container. Such mechanism, including a memory device, is disclosed in the above patent which is owned by the assignee of the present application.

An important object of my invention is the provision of simple mechanism for projecting and retracting the light focusing mirror tube in relation to the path of travel of the recumbent containers so that as each container arrives at the inspecting station and stops, the mirror tube will be projected momentarily to perform its intended function and then is retracted to allow resumption of the advancing movement of the containers and cradles.

Another object is the provision of mirror tube actuating means properly timed with the movement of the container carrying cradles and of exceedingly simple and per se of inexpensive construction.

Other objects will be in part apparent and in part pointed out hereinafter.

Figure 5:
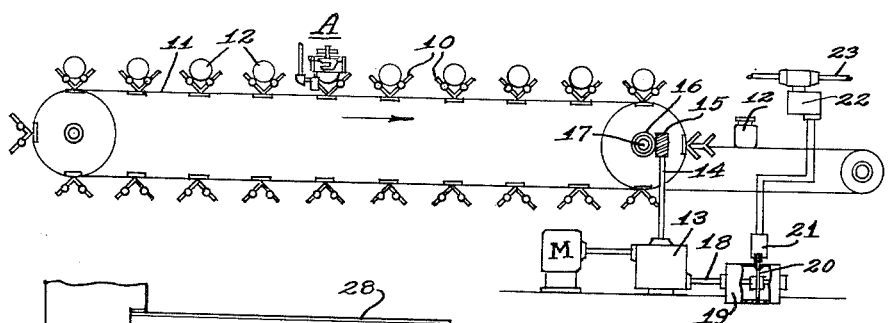
FIG. 5 is a schematic view showing the jar carrying cradles and mechanism timed therewith for actuating the mirror tube.

In FIG. 5, I have revealed more or less schematically a machine with which my invention may be used to advantage. It is of the type revealed in the above identified Noble et al. patent. A plurality of cradles 10 carried by an endless chain 11 are moved intermittently to bring containers 12 supported thereby to a succession of inspecting or gauging stations. Power is imparted to the chain 11 from a motor M operating through a gear box 13, or, perhaps a Geneva drive and a driven shaft 14, the latter carrying a worm 15 meshing with a worm gear 16 on the sprocket shaft 17. A take-off shaft 18 connected to the gear box 13 actuates a timer 19 which in turn operates a rotary cam 20, the function of which is to periodically close a microswitch 21 whereby to operate a solenoid valve 22 in an air pressure supply line 23. This control arrangement has been found expedient, but obviously others may be utilized. The devices are staple items obtainable on the open market and are well known. Hence, structural details have not been illustrated. The above described control devices regularly control operation of the mirror tube actuating means and time projection and retraction of the tube with arrival at and departure from an inspecting station of the jar or bottle being checked.

The mirror tube control apparatus comprises a base or support 24 (FIG. 1) rigidly mounted at the crizzle detecting station A. Upon this base is mounted the conventional light source and lens assembly 25, such being adjustable vertically and laterally by reason of the slidingly mounted carrier leg 26 which is secured in a bracket 27 (FIG. 1) on said base 24. Forwardly of the lens assembly 25 and at a higher elevation than the latter is a pick-up 28. The mirror tube 29 is of conventional form, being placed directly in front of the lens assembly 25 so that when projected into the mouth of a jar they are coaxial as in FIG. 1.

Figure 1:
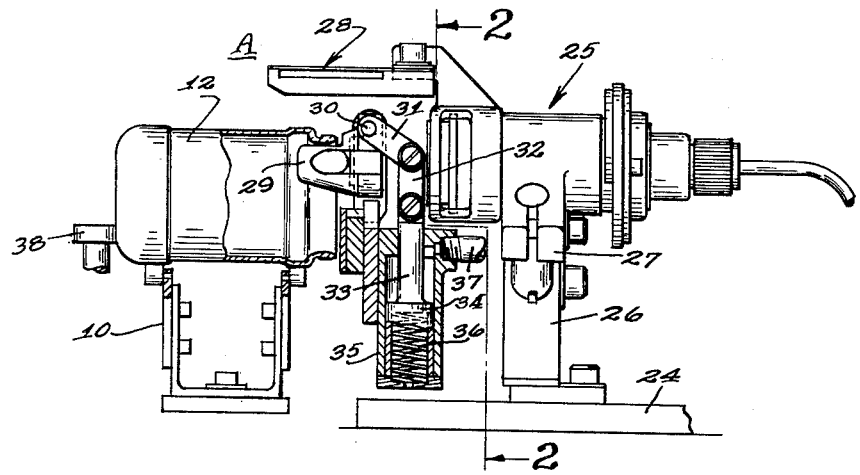
FIG. 1 is a side elevational view partly in section, showing my invention.
Figure 2:
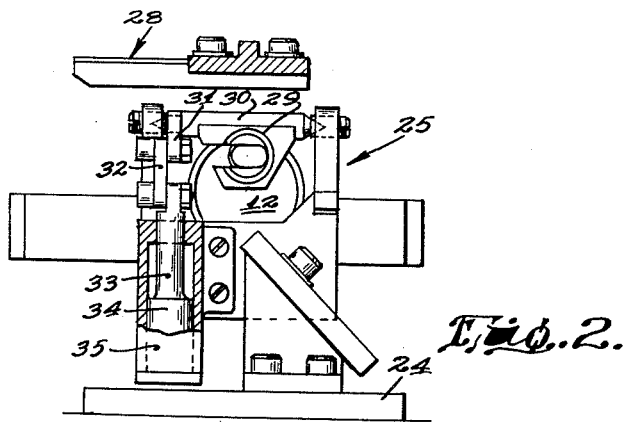
FIG. 2 is a sectional elevational view taken along the line 2—2 of FIG. 1.
Figure 3:
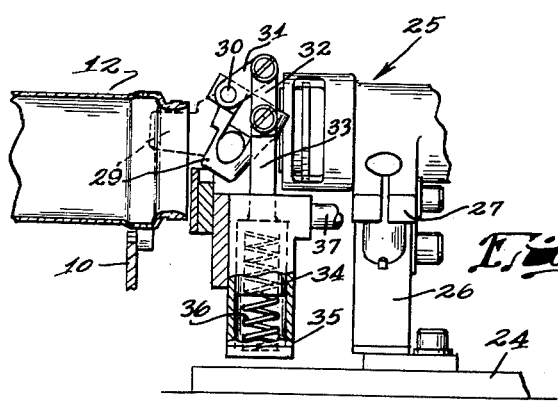
FIG. 3 is a fragmentary sectional elevational view showing two extreme positions of the light focusing mirror tube.
Figure 4:
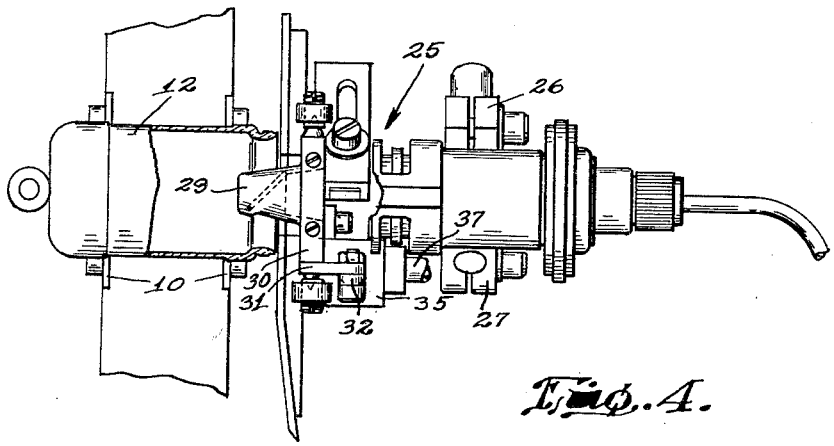
FIG. 4 is a top plan view.
Figure 6:
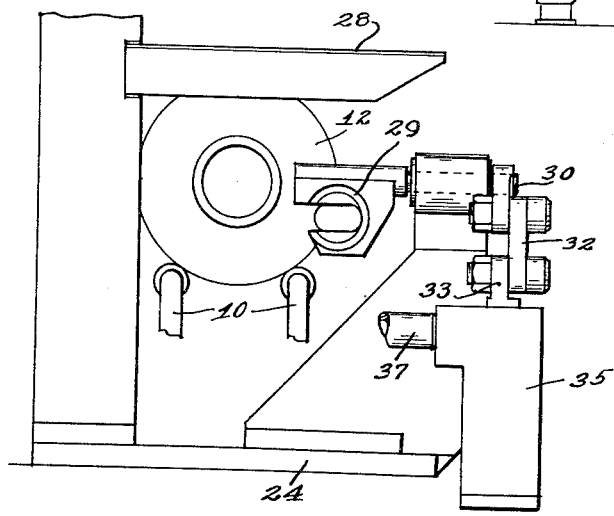
FIG. 6 is a view showing the mirror tube positioned exterior to a narrow neck container or bottle.

Projection and retraction of the mirror tube is obtained by suspending it from a horizontal pivot or rock shaft 30, the latter at one end being connected by a lever 31, link 32 and piston rod 33 to an air pressure operated piston 34. This piston is positioned in a vertical cylinder 35 so that together they provide a piston motor for actuating the mirror tube. Normally an expansion coil spring 36 within the lower part of the hollow piston operates to retract the mirror from the path of travel of the jars, or bottles 12. The motor cylinder is closed at its upper end except for an aperture through which the piston rod extends upwardly to the link 32. The supply line 23 for air under pressure has an end connected to the port 37 near the upper end of the cylinder 35. The aforementioned solenoid valve 22 opens at proper intervals, thereby introducing air under pressure into the upper end of the cylinder 35 sufficient to overcome the spring 36 and lower the piston as shown in FIG. 1. Thus the mirror tube is projected into the jar mouth and causes focusing of light upon a selected internal annular surface of the container. The container incidentally is rotated on its axis at this time by a roller 38 so that the device scans the entire surface which is to be inspected. In the event so-called narrow-neck ware is being inspected it, of course, would be impossible to insert the mirror tube 29 into the neck opening. Therefore, as indicated in FIG. 6, the mirror is so mounted that when projected, it occupies a position quite close to the exterior surface of the neck or finish of the bottle 12. In the event a crizzle or check is in the area scanned, the beam of intense light is deflected to the pick-up with the results heretofore explained.

Whether the mirror tube is within or exterior to the container neck, the presence of a crizzle, check or the like defect in the scanned area will direct an intense beam of light to the pick-up which in turn causes actuation of a conventional or any preferred form of throw-out device (not shown) which discards the defective ware.

Modifications may be resorted to within the spirit and scope of the appended claims.

I claim:

1. In apparatus for inspecting and detecting crizzles and the like imperfections in the neck area of a glass container, means for moving an open-ended container along a definite path to an inspecting station, means for rotating the container on its axis at said station, inspecting means at said station comprising a lens and light source assembly, a mirror tube mounting said lens, a rock shaft mounting for said tube at said station, means operating in timed relation to the advancing movement of the container and connected to said tube for moving the latter into and out of inspecting position, thereby alternately projecting and retracting said tube for focusing light upon an annular zone of the container, comprising a piston-type, fluid actuated motor, a linkage connecting the motor and said rock shaft, and control means operated in response to movement of the container to the inspecting station for actuating the motor to rock said shaft and thereby move the mirror tube into inspecting position.

2. The apparatus as defined in claim 1 wherein the means for moving the container to the inspecting station operates to support the container in a recumbent position at said station, the mirror tube at the inspecting position being inserted into the neck of the container while at said station.

3. The apparatus as defined in claim 1 wherein the mirror tube is moved to an inspecting position proximate the exterior neck surface of the container.

4. Apparatus as defined in claim 1, and spring means for actuating the motor to effect retraction of the mirror tube.

References Cited in the file of this patent

UNITED STATES PATENTS

| | | |
|---|---|---|
| 2,405,483 | Abrams | Aug. 6, 1946 |
| 2,753,459 | Fedorchak | July 3, 1956 |
| 2,755,703 | Politsch et al. | July 24, 1956 |
| 2,759,600 | Saylor | Aug. 21, 1956 |